(12) United States Patent
Okuyama et al.

(10) Patent No.: US 7,073,037 B2
(45) Date of Patent: Jul. 4, 2006

(54) SYSTEM FOR CONTROLLING HOST ACCESS TO A STORAGE DEVICE BASED ON PHYSICAL CHARACTERISTICS OF THE STORAGE DEVICE

(75) Inventors: Atsushi Okuyama, Chiyoda (JP); Seiichi Domyo, Sagamihara (JP); Hitoshi Ogawa, Yokohama (JP); Kazuaki Usui, Chiyoda (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 332 days.

(21) Appl. No.: 10/601,632

(22) Filed: Jun. 24, 2003

(65) Prior Publication Data
US 2004/0030650 A1   Feb. 12, 2004

(30) Foreign Application Priority Data
Jun. 24, 2002 (JP) .............................. 2002-182325

(51) Int. Cl.
*G06F 12/14* (2006.01)
(52) U.S. Cl. .................................................. 711/164
(58) Field of Classification Search ................ 711/163, 711/164
See application file for complete search history.

(56) References Cited

U.S. PATENT DOCUMENTS

| 6,046,870 A | * | 4/2000 | Karube ........................ 360/31 |
| 6,636,689 B1 | * | 10/2003 | Stebbings ..................... 386/94 |
| 6,782,458 B1 | * | 8/2004 | Noble ......................... 711/163 |

FOREIGN PATENT DOCUMENTS

JP      A-2001-256004       9/2001

\* cited by examiner

*Primary Examiner*—Matthew D. Anderson
*Assistant Examiner*—Hetul Patel
(74) *Attorney, Agent, or Firm*—Antonelli, Terry, Stout and Kraus, LLP.

(57) ABSTRACT

An information recording/reproducing system in which a host system making access to a magnetic disk apparatus can be limited to a specific one. A magnetic disk apparatus includes an authentication key generating block for generating an authentication key on the basis of physical characteristic(s) of the magnetic disk apparatus itself. The magnetic disk apparatus and the host system have, respectively, authentication key recording block for recording the authentication key and authentication data generating block for generating authentication data on the basis of the authentication key. Access from the host system to information of the magnetic disk apparatus is controlled based on the authentication data of the host system and the authentication data of the magnetic disk apparatus.

5 Claims, 10 Drawing Sheets

FIG.2

| SECTOR ID NUMBER / HEAD ID NUMBER | 0 | 1 | 2 | 3 | 4 | 5 |
|---|---|---|---|---|---|---|
| 0 | 0 | 1 | 2 | 3 | 4 | 5 |
| 1 | 6 | S1 | 7 | 8 | 9 | 10 |
| 2 | 11 | 12 | 13 | R2 | 15 | S3 |
| 3 | 16 | 17 | 18 | 19 | 14 | SP |

FIG.3

| | | |
|---|---|---|
| S1 | HEAD ID NUMBER | 1 |
| | SECTOR ID NUMBER | 1 |
| R2 | PRIMARY HEAD | 2 |
| | PRIMARY SECTOR | 3 |
| | SECONDARY HEAD | 3 |
| | SECONDARY SECTOR | 4 |
| S3 | HEAD ID NUMBER | 2 |
| | SECTOR ID NUMBER | 5 |

ORIGINAL DATA

ORIGINAL DATA   ADDTIONAL DATA

ADDTIONAL DATA   ORIGINAL DATA

ORIGINAL DATA   ADDTIONAL DATA   ORIGINAL DATA

SYSTEM FOR CONTROLLING HOST ACCESS TO A STORAGE DEVICE BASED ON PHYSICAL CHARACTERISTICS OF THE STORAGE DEVICE

BACKGROUND OF THE INVENTION

The present invention relates to an information recording/reproducing system having a magnetic disk apparatus for recording/reproducing information and a host system capable of removably connecting the magnetic disk apparatus for making access thereto. More particularly, the present invention is concerned with an information recording/reproducing system in which the host system which is allowed to make access to the magnetic disk apparatus can be limited to a specific one.

There has been proposed a system designed for such application in which a magnetic disk apparatus is removably connected to a host system for recording/reproducing data such as motion pictures and sound in cooperation with an audio server, a video recorder, a portable information terminal, a car navigation system or the like. Because of the removable arrangement, such a problem is conceivable from the standpoint of security that a third party may unjustifiably dismount the magnetic disk apparatus to read/write information with the aid of another host system. As a technique for limiting the combination of the magnetic disk apparatus and the host system, there can be mentioned a mutual authentication processing in which authentication data is used. By way of example, JP-A-2001-256004 discloses a technique according to which one of the storage unit and the host system is designed to generate authentication data for an access control on the basis of authentication data generated by the other one to thereby perform the access control for the host system by using the first-mentioned authentication data. The authentication data is generated on the basis of the inherent information intrinsic to the storage unit or the host system and the date/time information. As the inherent information, the maker's name, machine identifier and/or serial number is used.

BRIEF SUMMARY OF THE INVENTION

With the technique disclosed in JP-A-2001-256004, there exists the possibility that the authentication key may be predicted because the easily acquirable information is used. Further, in case the authentication key of a certain apparatus should have been acquired by an unauthorized user, he or she may possibly predict authentication key of another apparatus on the basis of the maker's name, machine identifier and/or serial number without difficulty.

In the light of the state of the art described above, it is an object of the present invention to provide a system which is capable of limiting the combination of the magnetic disk apparatus and the host system to a specific one by realizing mutual authentication by using an authentication key which is difficult to predict.

In view of the above and other objects which will become apparent as description proceeds, there is provided according to an aspect of the present invention an information recording/reproducing system in which an authentication key generated on the basis of physical characteristic(s) of a magnetic disk apparatus is recorded in an authentication key storing means incorporated in each of the magnetic disk apparatus and the host system. By way of example, the authentication key may preferably be generated on the basis of medium defect characteristic or eccentricity characteristic of a magnetic disk mounted on the magnetic disk apparatus. Further, the magnetic disk apparatus and the host system are designed to generate authentication data by using the above-mentioned authentication key. The magnetic disk apparatus includes an access control means which is designed to control the access to the magnetic disk apparatus such that the access is limited to only a specific host system on the basis of the authentication data generated by the host system and the authentication data generated by the magnetic disk apparatus. Alternatively, an access control means of the host system may be so designed as to control the host system so that the host system can make access limitedly to only a specific magnetic disk apparatus on the basis of the authentication data generated by the magnetic disk apparatus and the authentication data generated by the host system.

No human activity plays any part in occurrence of the medium defect characteristic or the eccentricity characteristic of the magnetic disk. Besides, the characteristics differ from one to another magnetic disk apparatus. Thus, the authentication key generated on the basis of the medium defect characteristic or the eccentricity characteristic of the magnetic disk differ from one to another magnetic disk apparatus like the fingerprints of persons and thus the prediction of the authentication key is rendered to be extremely difficult.

Other objects, features and advantages of the invention will become apparent from the following description of the embodiments of the invention taken in conjunction with the accompanying drawings.

BRIEF DESCRIPTION OF THE SEVERAL VIEWS OF THE DRAWING

In the course of the description which follows, reference is made to the drawings, in which:

FIG. 2 shows an example of a defect location table;

FIG. 3 shows an example of defect management table;

FIGS. 11A to 11D are views for illustrating exemplary methods of generating authentication key, wherein FIG. 11A is a view for illustrating a method of modifying original data for generating an authentication key;

FIG. 11B is a view for illustrating another method of modifying original data for generating an authentication key;

FIG. 11C is a view for illustrating still another method of modifying original data for generating an authentication key; and FIG. 11D is a view for illustrating yet another method of modifying original data for generating an authentication key.

DETAILED DESCRIPTION OF THE INVENTION

The present invention will be described in detail in conjunction with what is presently considered as preferred or typical embodiments thereof by reference to the drawings.

Figure 1:
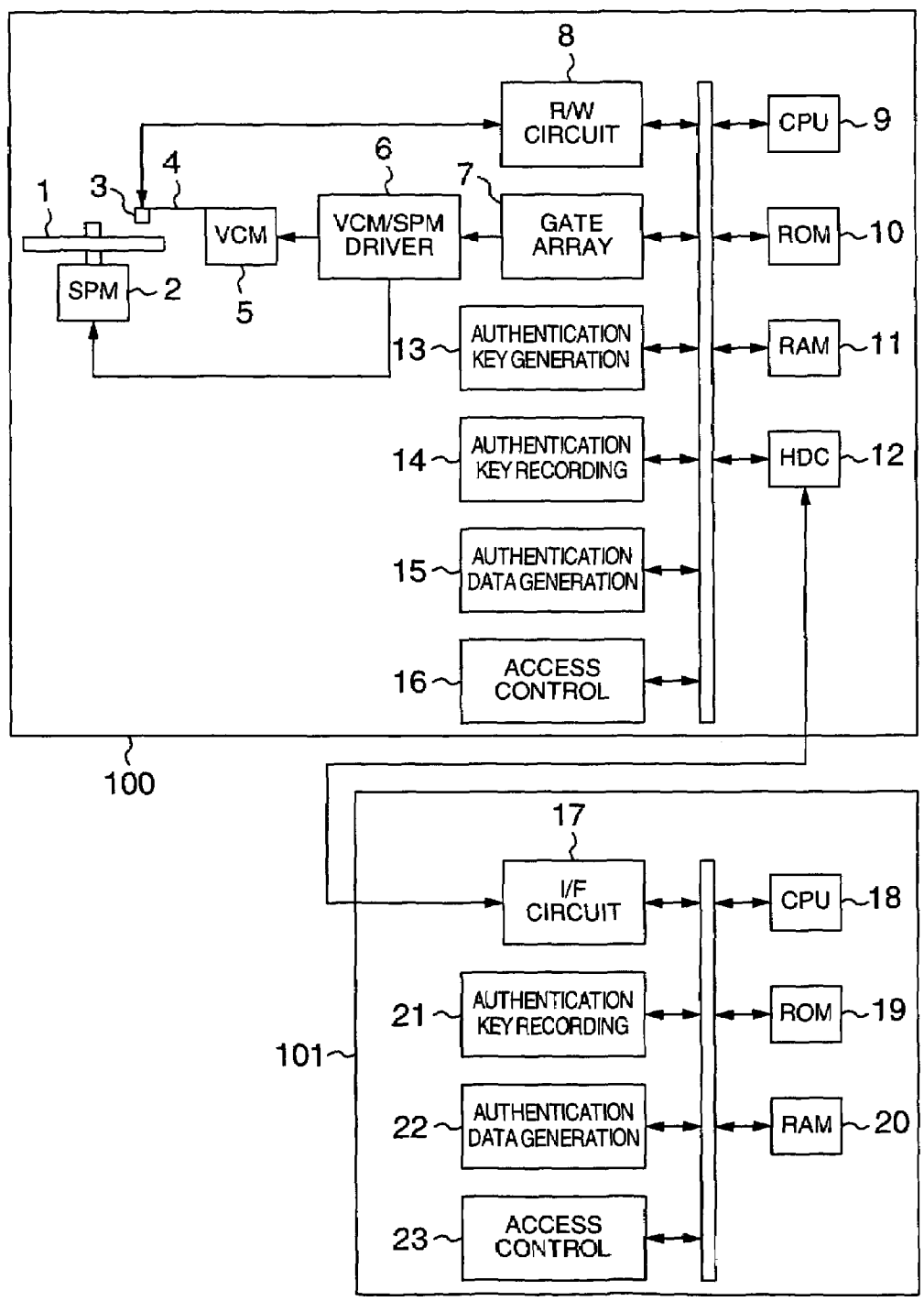
FIG. 1 is a view showing a system configuration of an information recording/reproducing system according to an embodiment of the present invention.

FIG. 1 is a view showing, by way of example, a system configuration of the information recording/reproducing system according to an embodiment of the present invention. As can be seen in the figure, the information recording/reproducing system according to the instant embodiment is comprised of a magnetic disk apparatus 100 and a host system 101. The magnetic disk apparatus 100 includes a magnetic disk 1 which is rotatably mounted on a spindle motor (SPM) 2. Incidentally, in each of tracks (not shown) on the magnetic disk 1, there are provided a servo area where servo information is recorded and a data area for recording data. A magnetic head 3 is mounted on an actuator 4 so that it can be displaced in the radial direction. The actuator 4 includes a voice coil motor (VCM) 5 which serves as a driving source. The spindle motor 2 and the voice coil motor 5 are supplied with a driving current from a VCM/SPM driver 6 to be thereby driven under the control of a central control unit (CPU) 9, as will be described later on. Ordinarily, the VCM/SPM driver 6 is supplied with a digital control value from the central control unit (CPU) 9 via a gate array 7 to output a driving current in conformance with above-mentioned control value. A read/write circuit (R/W circuit) 8 serves for demodulating a read signal derived from the output of the magnetic head 3 and supplying a write signal to the magnetic head 3. Incidentally, it should be added that the read/write circuit 8 incorporates a position detecting circuit (not shown) for detecting the position of the magnetic head 3 on the basis of the servo information. A hard disk controller (HDC) 12 is designed to control data transfer between the host system 101 and the magnetic disk apparatus 100. By way of example, the data supplied from the host system 101 is temporarily stored in a RAM (Random Access Memory) 11 under the control of the hard disk controller (HDC) 12. A central control unit (CPU) 9 serves for controlling the actuator and for other control purposes in accordance with control program(s) stored in the ROM (Read-Only Memory) 10. Further, in FIG. 1, reference numeral 13 denotes an authentication key generating block, 14 denotes an authentication key recording block, 15 denotes an authentication data generating block, and numeral 16 denotes an access control block. For more particulars of these blocks, elucidation will be made later on. The gate array 7, the read/write circuit (R/W circuit) 8, the central control unit (CPU) 9, the ROM 10, the RAM 11, the hard disk controller (HDC) 12, the authentication key generating block 13, the authentication key recording block 14, the authentication data generating block 15 and the access control block 16 are interconnected through buses. The magnetic disk apparatus 100 according to the instant embodiment of the invention is provided with the authentication key generating block 13, the authentication key recording block 14, the authentication data generating block 15 and the access control block 16 in addition to the information write/read module for writing (recording) and reading (reproducing) information on and from the magnetic disk of the conventional or hitherto known magnetic disk apparatus.

Further referring to FIG. 1, in the host system generally denoted by reference numeral 101, reference numeral 17 designates an interface (I/F) circuit, 18 designates a CPU (Central Processing Unit), 19 designates a ROM, 20 designates a RAM, 21 designates an authentication key recording block, 22 designates an authentication data generating block and numeral 23 designates an access control block. At this juncture, it should be mentioned that as the host system 101, a personal computer, an audio server, a video recorder, a portable information terminal, a car navigation or the like system is presumed and that all the components 17 to 23 mentioned above are not necessarily incorporated in the host system 101.

Next, description will be made of the authentication key generating block 13 taken as an example. Ordinarily, the recording/reproducing processing in the magnetic disk apparatus is performed on a sector-by-sector basis, wherein each sector is set as the minimum unit in the data recording area of the magnetic disk serving as the recording medium. In this conjunction, it is noted that among a large number of sectors defined in the data recording area of the magnetic disk, there will exist those sectors for which data recording/reproducing operation can not properly or normally be performed under the influence of dusts deposited on the magnetic disk surface, damages which the magnetic disk has suffered during the assembling process and other factors. These sectors will be termed the defective sectors. Accordingly, in order to ensure the reliability of the data to be recorded on the magnetic disk, it is required to detect properly the defective sectors mentioned above to thereby inhibit the data from being written in these defective sectors. Such being the circumstances, upon recording/reproduction of data performed on the magnetic disk, the processing for managing the defective sectors, i.e., what is called the defect management, is carried out in general.

The defects making appearance on the magnetic disk may be classified into a primary defect found upon initialization of the magnetic disk and a secondary defect found when the data recorded on the magnetic disk is read out after the data recording operation in order to verify whether or not the data has correctly been recorded. For enabling the defect management, an area referred to as the DMA (defect management area) which is destined for recording and storing the information concerning the defective sector(s) in the form of a table is provided in the data recording area of the magnetic disk. Every time the defective sector is detected, the position or location information or the like of the detected defective sector is written in the DMA table. In general, the primary defects are written in the location referred to as the primary defect list (PDL) of the defect management area (DMA) while the secondary defects are entered in the location termed the secondary defect list (SDL).

FIG. 2 shows, by way of example, a defect location table indicating the positions or locations of the defect sector information. In the figure, the head ID (IDentifying) numbers of the magnetic heads are taken along the ordinate with the sector ID (IDentifying) numbers of the magnetic disk apparatus are taken along the abscissa. In the case of the example shown in FIG. 2, the head ID numbers "0" to "3" are assigned to the magnetic heads, respectively, whereas the sector ID numbers "0" to "5" are assigned to the individual sectors, respectively. In the following, given location of concern in the list or table shown in FIG. 2 will be identified by a combination of the head ID number and the sector ID number in the form of "(head ID number, sector ID number)". Unless the defective sectors are detected, logical values "0" to "5" are stored in the table at the locations (0, 0) to (0, 5). In succession, the succeeding logical values "6" et seq. are stored, starting from the location (1, 0). Upon detection of the defective sector, information capable of discerning the type of the defect is stored. As the types of the defects, there are conceived a slip defect which allows the track to be traced by skipping the defective portion and a replacement defect which moves the defect to other table. In FIG. 2, the slip effect is indicated by attaching the prefix "S", as can be seen at (1, 1) and (2, 5). The replacement defect is indicated by attaching the prefix "R", as can be seen at (2, 3). Further, the ID numbers of the defects are represented serially by the logical values starting from "1".

FIG. 3 shows an example of the defect management table. In the defect management table shown in FIG. 3, the head ID numbers and the sector ID numbers suffering the defect are indicated, being picked up from the defect location table shown in FIG. 2. In the rows of the slip defects S1 and S3, the head ID number and the sector ID number are indicated for which the slip defect information is stored. In the replacement defect R2, there are indicated the head ID number and the sector ID number of the original position together with the head ID number and the sector ID number of the move destination.

Figure 4:
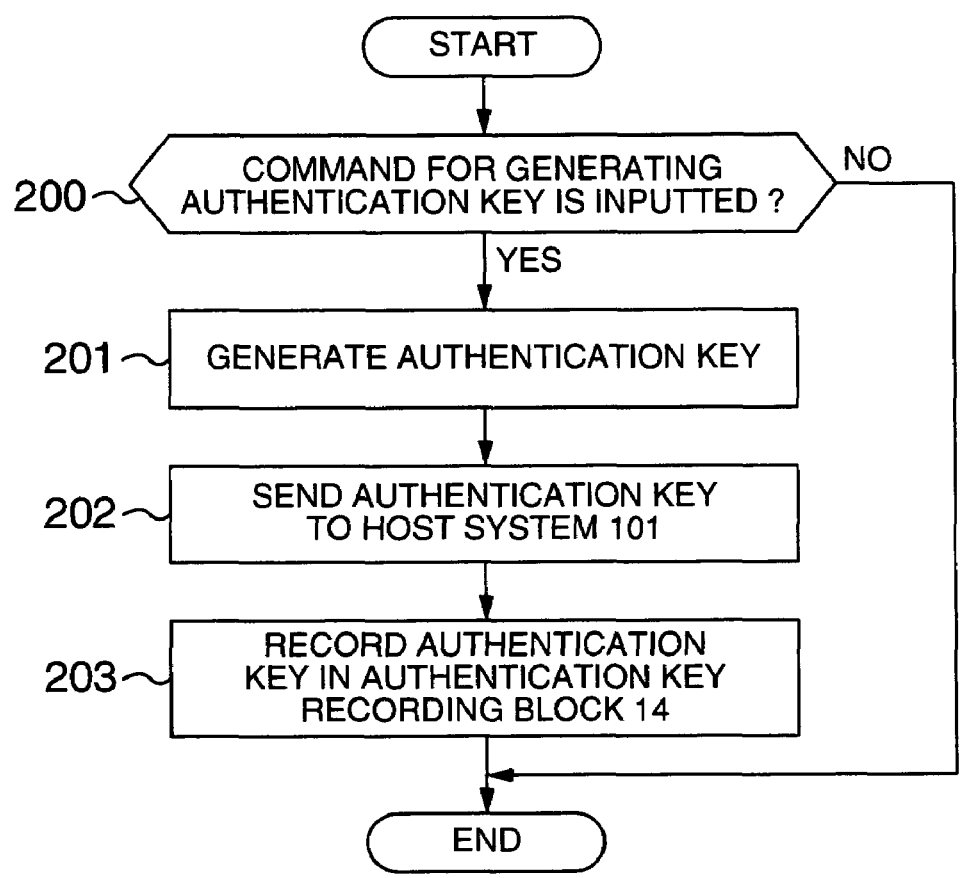
FIG. 4 is a flow chart for illustrating exemplarily a procedure of generating an authentication key.

The authentication key is generated on the basis of the defect management table mentioned above. FIG. 4 shows a flow chart for illustrating, by way of example, a procedure of generating an authentication key. Upon reception of a command requesting generation of the authentication key from the host system 101 (step 200), the authentication key is created or generated on the basis of the defect management table (step 201). Values are selected from the defect management table to be converted into binary numerals to thereby generate the authentication key of 56 bits or 128 bits within the range of e.g. 256 bits. Selection of the values from the defect management table may be performed in accordance with any given rule. Further, it is possible to select the defect management table values from the primary defect values by reading out only from the primary defect list (PDL) of the defect management area (DMA). Furthermore, it is also possible to create or generate a plurality of authentication keys in conformance with a number of the authentication keys which are required for generating the authentication data by the authentication data generating blocks 15 and 22, as will be described hereinafter.

Furthermore, when the authentication key is generated on the basis of only the primary defect or alternatively both the primary defect and the secondary defect as the original data, it is possible to modify the original data. In FIGS. 11A to 11D, there are illustrated methods of modifying the original data. According to the method of FIG. 11A, the sequential order of the original data is changed in accordance with a predetermined rule. In the case shown in FIG. 11B, predetermined data is added in succession to the original data. By contrast, in the case shown in FIG. 11C, predetermined data is added in precedence to the original data. In the case shown in FIG. 11D, predetermined data is added at an intermediate location of the original data. The predetermined data may be added to the original data at plural intermediate locations thereof. As the predetermined data, there may be mentioned, for example, an ID number for identifying a product group. However, it is desirable that random data, for example, be added as the predetermined data in order to ensure that no duplicate occurs in the authentication key. Needless to say, the original data may be modified by other method(s) than those mentioned above.

The authentication key generated is then sent to the host system 101 (step 202) and recorded in the authentication key recording block 14 (step 203). Additionally, in the host system 101, the received authentication key is also recorded in the authentication key recording block 21. As the features of the defect, there may be mentioned the types and the locations of the defects which differ from one to another magnetic disk apparatus. Additionally, it is noted that no human factor plays any part in generation of the defect. Accordingly, duplication of the defect is impossible, which means that the defect can serve as the very reliable authentication key which is immune to the nonauthorized substitution or the like. Further, it is expected that the recording density of the magnetic disk apparatus will increase with the number of the defects also increasing correspondingly in the not far distant future. Thus, in accompaniment with increasing of the recording density of the magnetic disk apparatus, it will become possible to generate the more reliable authentication key against the unauthorized substitution or falsification or the like.

Next, description will be directed to another exemplary embodiment of the authentication key generating block 13 according to the present invention. In general, eccentricity will take place in the track on the magnetic disk to be traced by the magnetic head due to factors which accompany the rotation of the magnetic disk. As the factors for such eccentricity, there can be mentioned the shaft vibration of the spindle motor (SPM) employed for rotating the magnetic disk, vibration of the magnetic disk upon writing of the servo information and others. In this conjunction, there is adopted in some application such a system that a servo information writing unit referred to as the servo writer dedicated for writing the servo information is employed for writing the servo information on the magnetic disk in place of the magnetic disk apparatus itself on which the magnetic disk is to be mounted. In that case, when the magnetic disk carrying the servo information recorded thereon is mounted on the magnetic disk apparatus, enormous eccentricity may possibly make appearance due to the error between the center of rotation of the spindle motor (SPM) and the center of rotation at the disk mounting position when the servo information bas been written by the servo writer. The amplitude accompanying such track eccentricity will amount to several tens μm in terms of the positional error magnitude of the magnetic head. At this juncture, it should also be added that the disk eccentricity characteristic will differ on a track-by-track basis in one and the same magnetic disk apparatus.

In the magnetic disk apparatus designed for high track density, the error tolerance which can ensure the data recording/reproduction without fail lies in a range from zero to several micrometers (μm). In the case where the error exceeds the above-mentioned tolerance range, it becomes difficult to cause the magnetic head to trace or follow the target track. For this reason, such measures are generally adopted that the eccentricity compensating signal is generated for reducing the positional error due to the eccentricity by detecting the disk eccentricity characteristic to thereby compensate for the influence of the eccentricity in the head positioning control system. As the method of generating the eccentricity compensating signal, there have been proposed a variety of methods such as a method based on repetitive control, a method based on Fourier series expansion, a method based on disturbance observer, etc. The eccentricity compensation can globally be classified into a real-time-based eccentricity compensation and a table-reference-based eccentricity compensation according to which a table is previously prepared on the basis of the eccentricity compensating signal to thereby allow the table value to be read out on the basis of the servo sector number. However, the low order eccentricity characteristic on the order of several times as high as the rotation frequency of the magnetic disk is caused to change under the influence of the operating conditions such as the ambient temperature. Such being the circumstances, the eccentricity of low order is generally compensated for by generating the eccentricity compensating signal on a real time basis.

Figure 5:
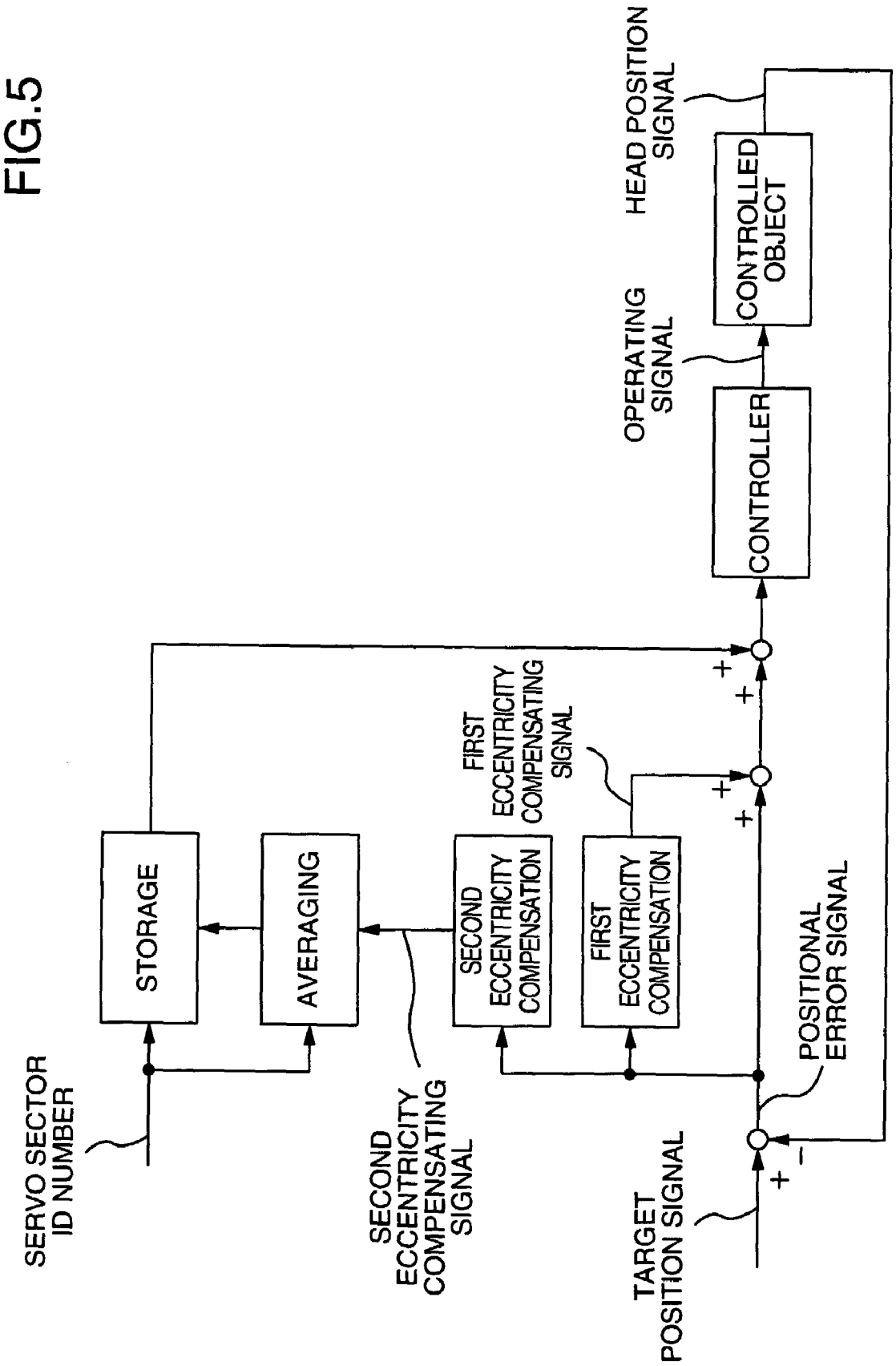
FIG. 5 shows exemplarily a head positioning control system in a block diagram.
Figure 6:
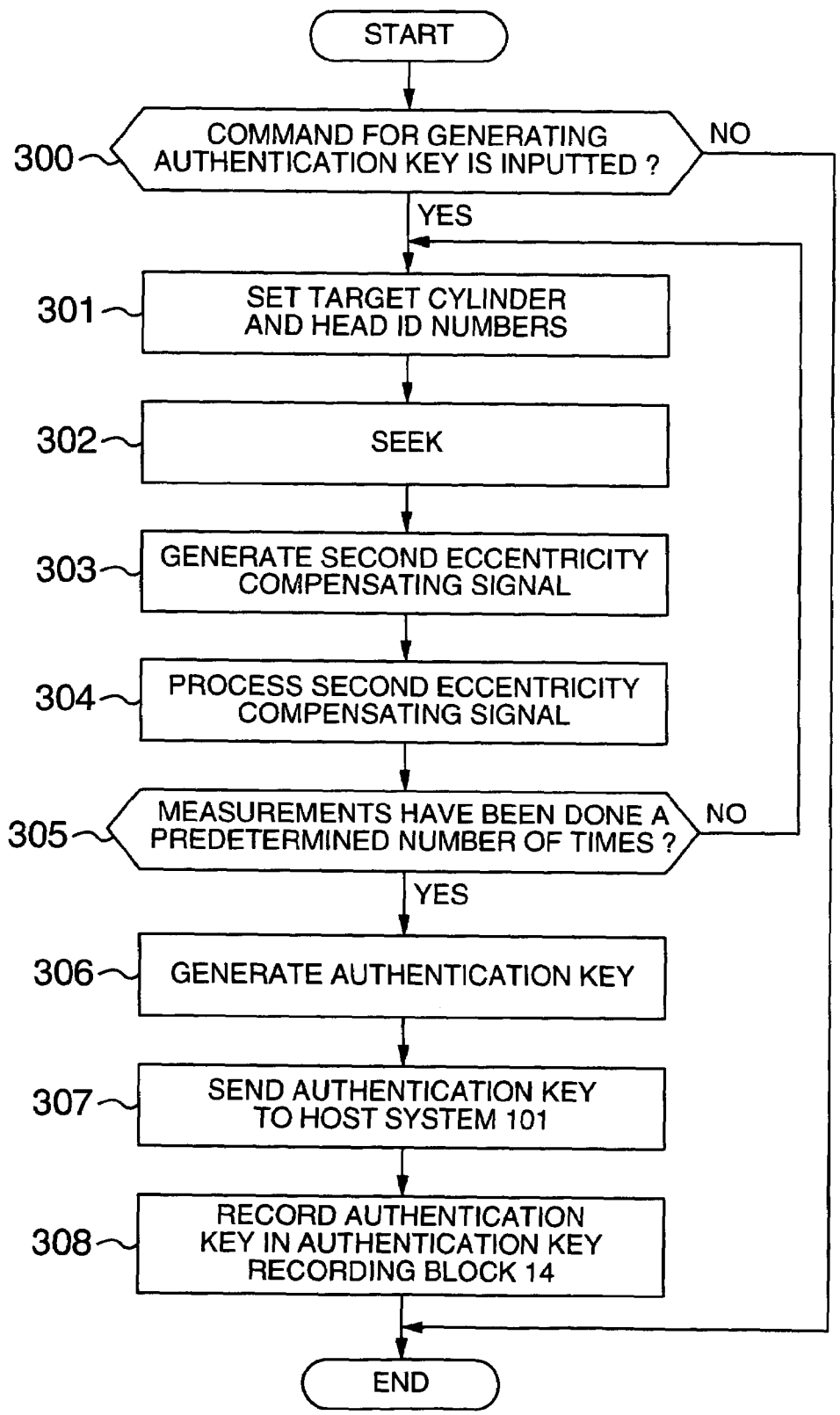
FIG. 6 is a flow chart for illustrating exemplarily a procedure of generating the authentication key.

The authentication key is generated on the basis of the eccentricity compensating signal mentioned above. FIG. 5 shows in a block diagram an exemplary arrangement of the head positioning control system. Further, FIG. 6 shows a flow chart for illustrating, by way of example, an authentication key generation procedure. In the head positioning control system now under consideration, a feedback control system is implemented which operates on the basis of the position signal of the magnetic head 3 detected from the servo information read out by the magnetic head 3. More particularly, the controlled object (i.e., object for the control) is a moving mechanism for the magnetic head 3 which is composed of the voice coil motor (VCM) 5 and others as described hereinbefore by reference to FIG. 1. On the other hand, a controller, a first eccentricity compensating block, a second eccentricity compensating block and an averaging block shown in FIG. 5 are implemented in the form of programs executed by the central control unit (CPU) 9. Further, a storage block may be constituted by a memory such as the ROM 10 or the RAM 11 or the like. Alternatively, the storage block may be constituted by a specific recording area of the magnetic disk 1. In this conjunction, with the phrase "specific recording area", it is intended to mean an unrewritable servo area (i.e., access-incapable servo area) such as, for example, a replacement sector (redundant recording area) or a servo area which is unsusceptible to the data rewriting through the ordinary recording operation.

The low order eccentricity characteristic which is considered to vary, as the case may be, is compensated for by the first eccentricity compensating block on a real time basis, while the other eccentricity characteristics are compensated for by the second eccentricity compensating block by resorting to the table reference scheme. It should however be mentioned that the second eccentricity compensating signal is acquired by performing the average processing on the values of the second eccentricity compensating signal for one and the same sector number over e.g. four rotations of the disk and then stored in the storage block. In that case, filter processing may additionally be performed for the purpose of noise elimination. The second eccentricity compensating signal resulting from the average processing is read out on the basis of the servo sector number. The eccentricity compensating block may be implemented by any method so far as the eccentricity compensating signal can be generated. Further, similar procedure can also be realized by generating the eccentricity compensating signal on the basis of the operation signal and adding the generated eccentricity compensating signal to the operation signal.

Upon reception of the request command for generation of the authentication key from the host system 101 (step 300), the target cylinder and the head ID number are set (step 301), whereupon seek operation is performed (step 302). In succession, after having sought the target cylinder, convergence of the transient characteristic of the first eccentricity compensating signal is waited for by leaving the disk to make e.g. four complete rotations, whereon the averaged second eccentricity compensating signal is generated (step 303). Thereafter, on the basis of the averaged second eccentricity compensating signal, processing for extracting the high order components which are unsusceptible to the influence of use conditions such as the ambient temperature or the like is executed (step 304). To this end, a highpass filter processing, for example, may be executed to extract the high order components from the second eccentricity compensating signal. By the way, the filter characteristic should desirably be such that the phase is zero or the group delay characteristic is constant. Further, wavelet transformation may be performed to extract the high order components from the second eccentricity compensating signal. To this end, multiple resolution analysis, for example, may be performed to thereby use highpass elements resulting from the first wavelet decomposition. Of course, the result of the second et seq. wavelet decompositions may be made use of. Alternatively, wavelet packet analysis may be performed to make use of the highpass elements resulting from the first wavelet packet decomposition. Furthermore, the results of the second et seq. wavelet packet decompositions may be made use of.

The processings in the steps 301 to 304 are carried out repetitively an appropriate number of times (step 305). By way of example, in the case where one hundred servo sectors exist on one track, the processing steps 301 to 304 are executed three times while changing the target cylinders to thereby generate three hundreds of the averaged second mean eccentricity compensating signal values. From the three hundreds of the averaged second eccentricity compensating signal values, values are selected to be converted into binary numerals to thereby generate the authentication key of 56 bits or 128 bits within the range of e.g. 256 bits (step 306). The target cylinder may be selected in accordance with any given rule. Further, selection of the value(s) to be converted into the binary numeral(s) may equally be made in accordance with any given rule. Furthermore, it is also possible to create or generate a plurality of authentication keys in conformance with the number of authentication keys which are required for generating the authentication data by the authentication data generating blocks 15 and 22, as will be described hereinafter.

The generated authentication key is sent to the host system 101 (step 307) and at the same time recorded in the authentication key recording block 14 (step 308). Additionally, in the host system 101, the authentication key received is recorded in the authentication key recording block 21.

As a feature of the eccentricity, there can be mentioned the fact that the characteristic differs from one to another magnetic disk apparatus. Additionally, it is noted that no human activity can play any role in the generation of eccentricity. Accordingly, duplication is rendered impossible, which means that the eccentricity can be utilized as the very reliable authentication key against the unauthorized substitution or the like. By the way, it is expected that the track density of the magnetic disk apparatus increases with the number of the servo sectors increasing correspondingly in the future. Thus, in correspondence to increasing of the recording density of the magnetic disk apparatus, it will become possible to generate the more and more reliable authentication key against the unauthorized substitution or the like.

The authentication keys mentioned above are recorded in the authentication key recording block 14 of the magnetic disk apparatus 100 and the authentication key recording block 21 of the host system 101. The authentication key recording blocks 14 and 21 may be each constituted by a ROM or the like memory. Besides, the authentication key recording block 14 may be replaced by the ROM 10 with the authentication key recording block 21 being also replaced by the ROM 19. Alternatively, the authentication key may be recorded in a specific recording area of the magnetic disk 1. Parenthetically, the phrase "specific recording area" means an unrewritable (inaccessible) area such as the replacement sector (redundant recording area) or the servo area in which data can not be rewritten by the ordinary recording operation. By adopting these measures in combination, it is possible to generate the more reliable authentication key against the falsification, substitution or the like.

Generation of the authentication key through the procedure illustrated in FIG. 4 or FIG. 6 may be carried out at the time point at which the magnetic disk apparatus is mounted on the host system with a view to limiting the combination of the magnetic disk apparatus and the host system. By way of example, a flag is prepared which is set to "1" when the authentication key is generated at the first time on the side of the magnetic disk apparatus. In other words, when the authentication key has been generated even only once, the above-mentioned flag continues to remain "1". This flag should preferably be generated in the unrewritable area (inaccessible area) such as replacement sector (redundant recording area) and the servo area in the ordinary data writing or recording operation.

Upon mounting of the magnetic disk apparatus on the host system, the latter commands the former to confirm or check the flag information and send the result thereof. In case the above-mentioned flag is "0", a command is issued to the magnetic disk apparatus for requesting generation of the authentication key and sending thereof. Alternatively, when the magnetic disk apparatus is mounted on the host system with a view to limiting the combination, the user, for example, may input the command for requesting generation of the authentication key to the host system.

In response to the input of the authentication key generation request command, the host system sends to the magnetic disk apparatus a command requesting generation of the authentication key and sending thereof. In that case, it is desirable that the host system manages the number of times the request for generation of the authentication key has been issued by the user with a view to imposing limitation on the number of times the user can request generation of the authentication key. Furthermore, the authentication key may be generated when operation of the information recording/reproducing system including the magnetic disk apparatus and the host system is stopped.

Upon reception of the stop command, the host system sends to the magnetic disk apparatus a command requesting generation of the authentication key and sending thereof. In that case, it is desirable that the host system sends a flag indicating the completed reception of the authentication key to the magnetic disk apparatus, which responds to the reception of the flag to stop the operation thereof, while the host system stops the operation thereof after lapse of a predetermined time intervening between the sending of the flag and the complete stoppage of the magnetic disk apparatus. In that case, upon reactivation, the authentication key has been updated to the value which reflects the change of the defect characteristic or the eccentricity characteristic, if it had occurred during the preceding operation for some reason. Besides, by using the different authentication keys upon every activation, very firm insusceptibility can be realized against the unauthorized substitution or falsification.

Figure 7:
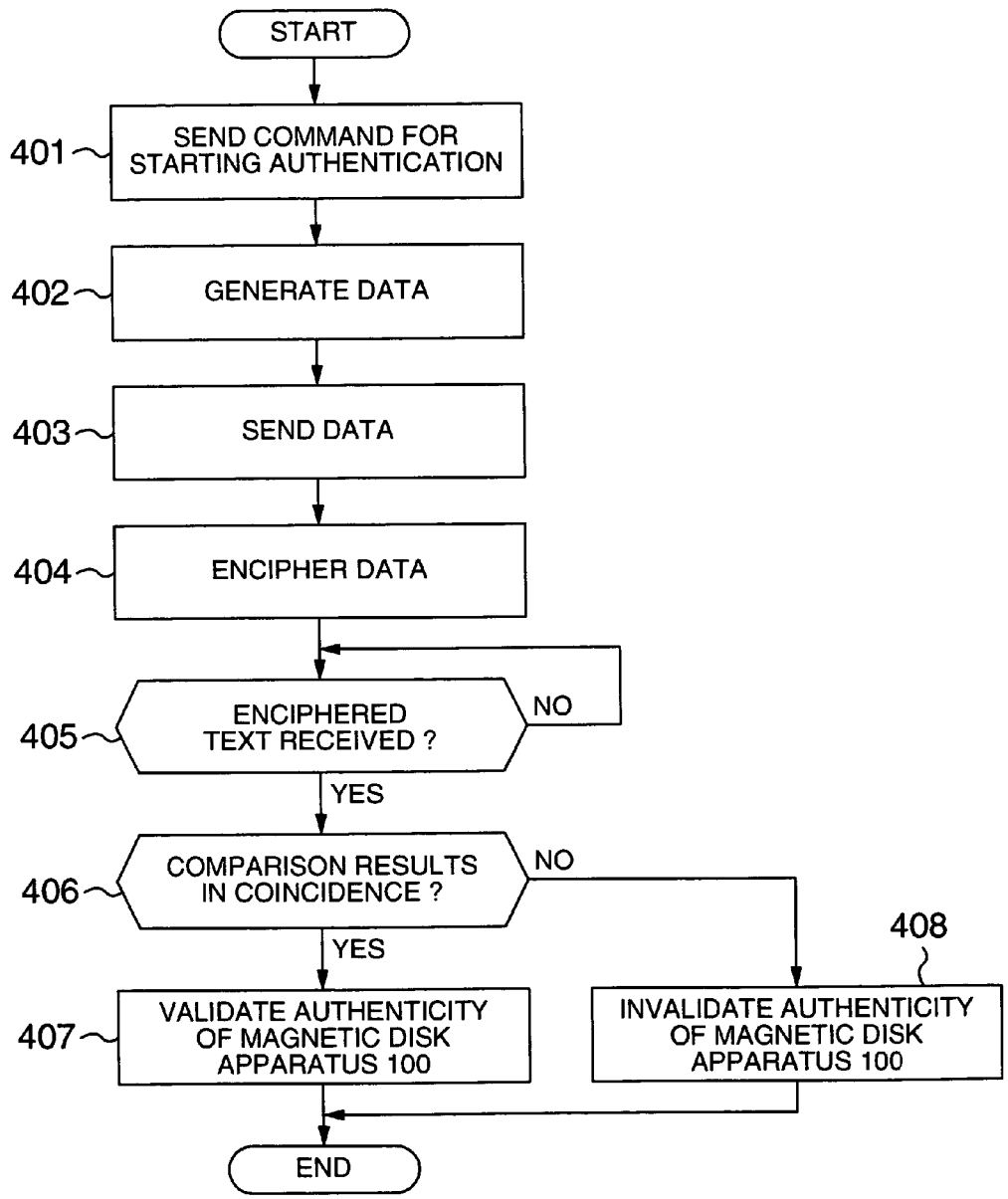
FIG. 7 is a flow chart for illustrating exemplarily a procedure of authentication processing.
Figure 8:
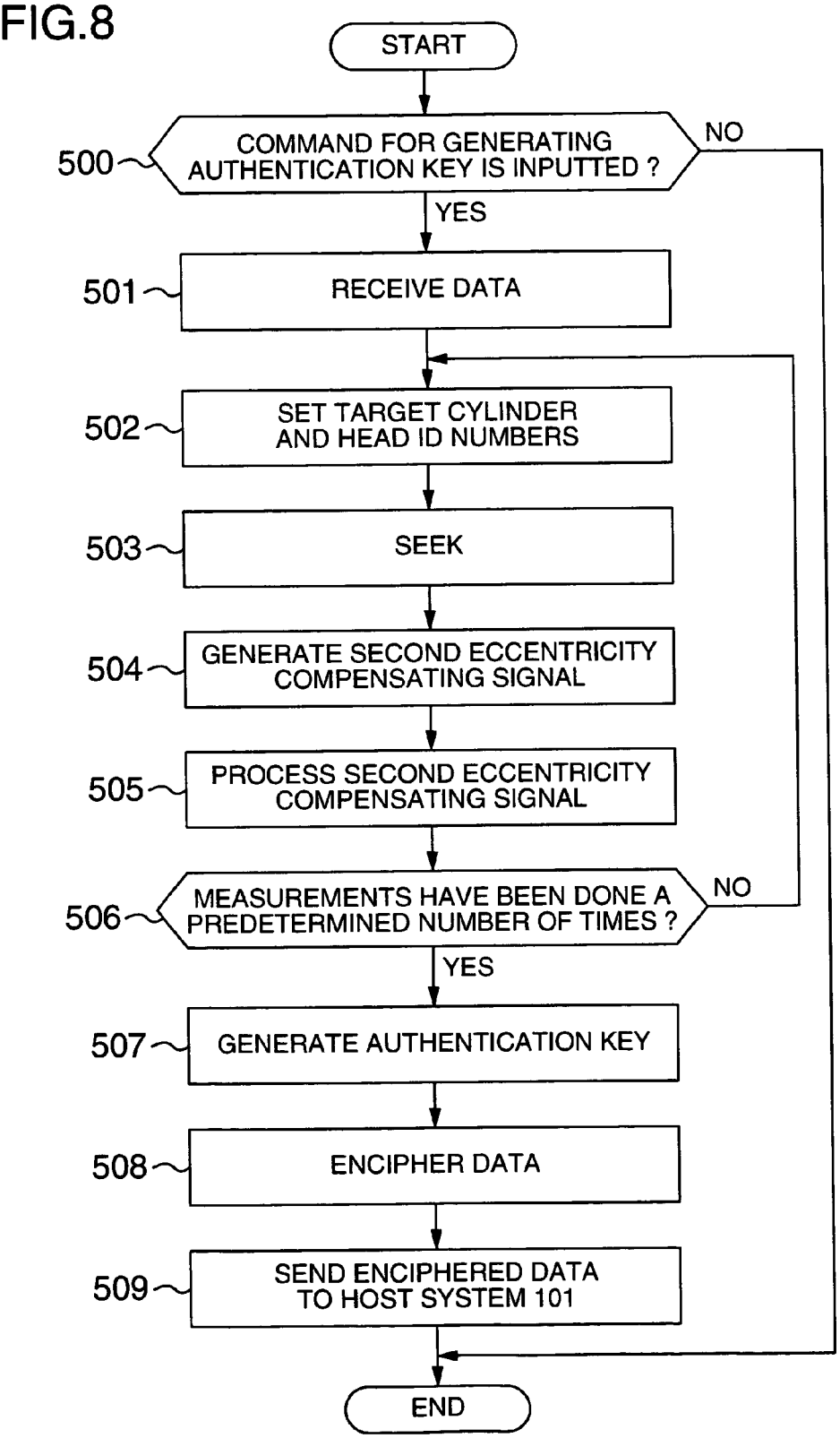
FIG. 8 is a flow chart for illustrating exemplarily a procedure of authentication processing.

Next, description will turn to the authentication procedure executed by the magnetic disk apparatus 100 and the host system 101. FIG. 7 is a flow chart for illustrating exemplarily a procedure for performing the authentication of the magnetic disk apparatus 100 as executed by the host system 101. FIG. 8 is a flow chart for illustrating exemplarily a procedure executed on the side of the magnetic disk apparatus 100 in response to reception of the command for starting the authentication from the host system 101.

At the first, description will be made of the procedure executed on the side of the host system 101. The host system 101 sends a command indicating the start of authentication to the magnetic disk apparatus 100 (step 401). In succession, original data for the authentication data is generated (step 402) to be subsequently sent to the magnetic disk apparatus 100 (step 403). This data may be given random data, if appropriate. Subsequently, this data is encrypted or enciphered by using the authentication key possessed by the host system 101 (step 404), and then the host system 101 waits for the sending of the encrypted or enciphered text from the magnetic disk apparatus 100 (step 405). Upon reception of the enciphered text from the magnetic disk apparatus 100, the enciphered text owned by the host system 101 and that received from the magnetic disk apparatus 100 are compared with each other (step 406). When comparison results in coincidence, the authenticity of the magnetic disk apparatus 100 is established (step 407). On the other hand, when the comparison results in discrepancy, the authenticity of the magnetic disk apparatus 100 is not established.

Next, description will be directed to the procedure executed on the side of the magnetic disk apparatus 100. Upon reception of the authentication start command (step 500), the magnetic disk apparatus 100 receives the data sent from the host system 101 (step 501). Subsequently, through the procedure in the steps 502 to 507, the authentication key is generated. This procedure is similar to the procedure in the steps 301 to 306 described hereinbefore by reference to FIG. 6, repeated description will be unnecessary. Incidentally, in place of the procedure in the steps 502 to 507, the procedure for reading out the authentication key recorded in the authentication key recording block 14 may be adopted in the case where the authentication key based on the defect characteristic is to be used.

Subsequently, the data is encrypted or enciphered by using the authentication key (step 508), whereon the encrypted or enciphered text is sent to the host system 101. When coincidence is found in the enciphered text (step 406), this means that the host system 101 and the magnetic disk apparatus 100 have one and the same encryption key. Thus, the authenticity of the magnetic disk apparatus 100 can be established. Further, the processing illustrated in FIG. 7 may be executed on the side of the magnetic disk apparatus 100 by taking the host system 101 for the magnetic disk apparatus 100 while executing the processing procedure illustrated in FIG. 8 on the side of the host system 101 by taking the magnetic disk apparatus 100 for the host system 101. Then, the authenticity of the host system 101 can be verified by the magnetic disk apparatus 100. In that case, the procedure in the steps 502 to 507 represents the procedure for reading out the authentication key stored in the authentication key recording means 21. Incidentally, the aforementioned processing of encrypting or enciphering the data by using the authentication key is executed by the authentication data generating block 15 of the magnetic disk apparatus 100 and the authentication data generating block 22 of the host system 101.

Further, decision as to the authenticity or inauthenticity based on the enciphered text is made by the access control blocks 16 and 23 of the magnetic disk apparatus 100 and the host system 101, respectively. The authentication data generating blocks 15 and 22 may be of any type so far as the data can be encrypted or enciphered by using the authentication key. Further, the access control blocks 16 and 23 may be of any sort provided that identicalness or sameness of the enciphered texts can be determined through comparison. By way of example, the enciphered texts may be converted into binary numerals to determine the logical product. If the logical product is "1", it can then be established that the enciphered texts coincide with each other.

When the authenticity of the host system 101 is ascertained on the side of the magnetic disk apparatus 100, then the host system 101 is allowed to access the magnetic disk apparatus. But, when the authenticity is negated, then the access of the host system 101 to the magnetic disk apparatus 100 is inhibited. On the other hand, when the authenticity of the magnetic disk apparatus 100 is ascertained on the side of the host system 101, then the access to the magnetic disk apparatus 100 is enabled, whereas when the authenticity of the magnetic disk apparatus is not ascertained, access to the magnetic disk apparatus 100 is disabled. Furthermore, in the case where the authenticity of the magnetic disk apparatus 100 can not be established on the side of the host system 101, this fact may be messaged to the user. By virtue of the mutual authenticity verification as described above, limitation is imposed on the possible combination of the host system 101 and the magnetic disk apparatus 100.

Figure 9:
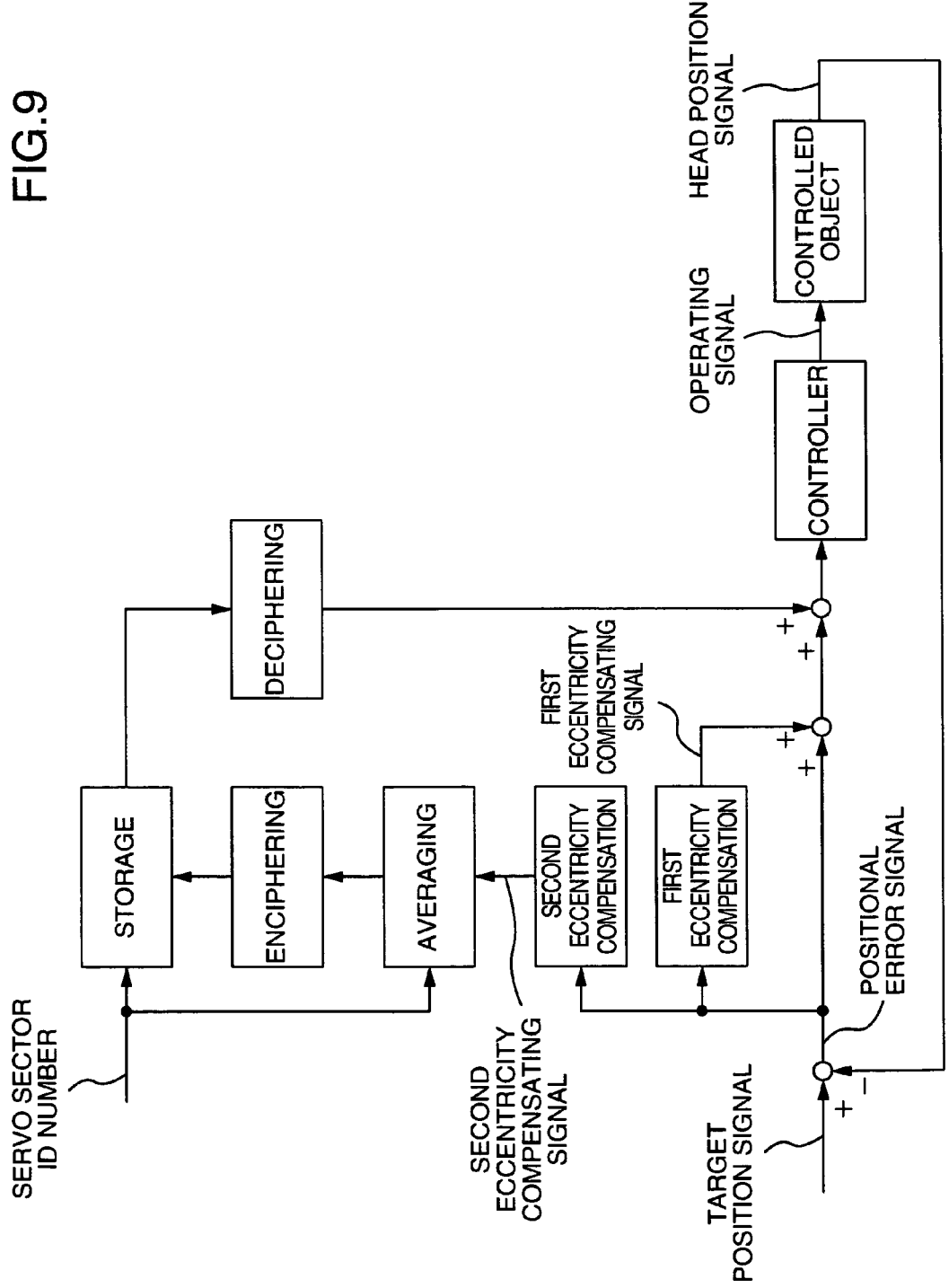
FIG. 9 shows exemplarily a head positioning control system in a block diagram.
Figure 10:
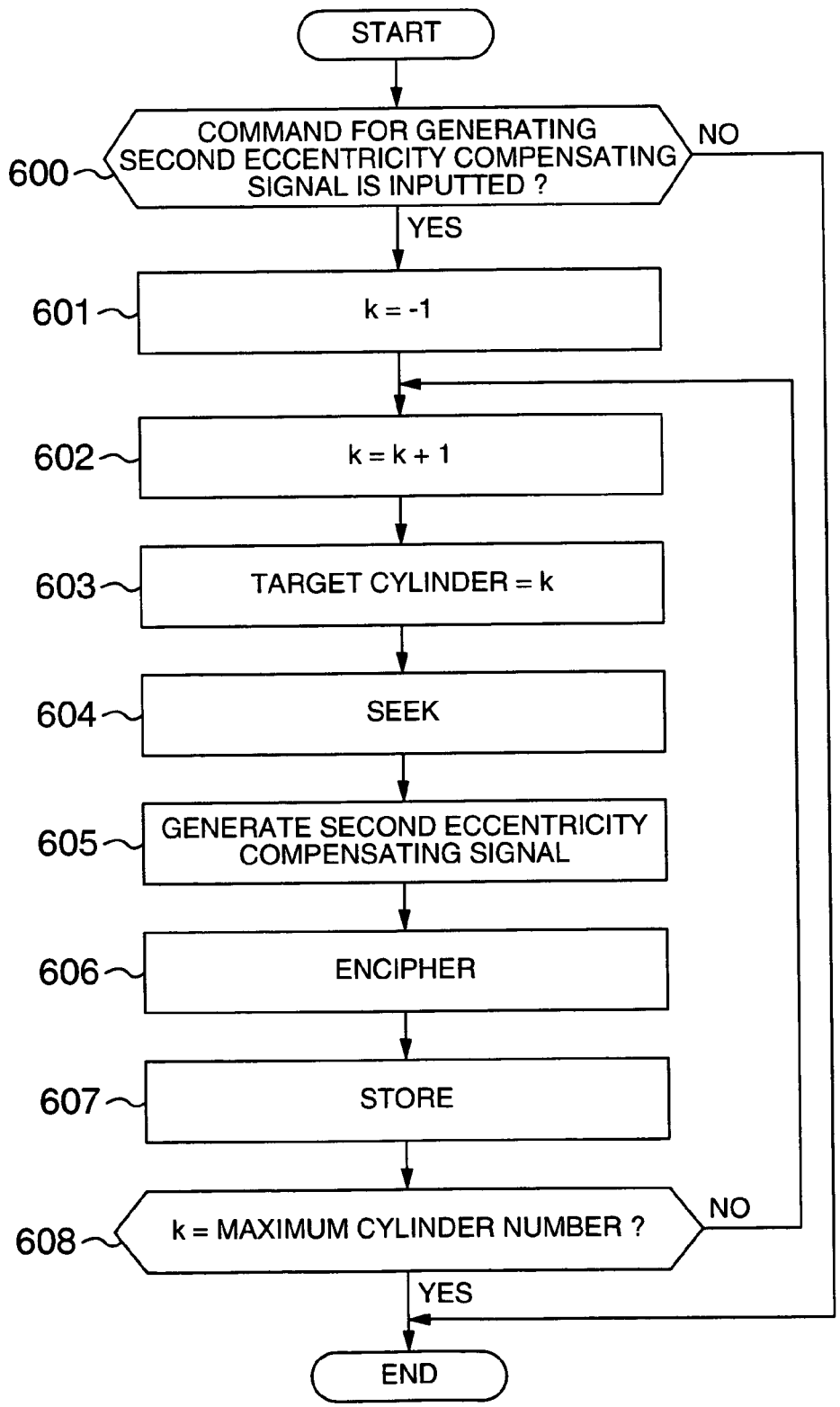
FIG. 10 is a flow chart for illustrating exemplarily a procedure for generating a second eccentricity compensating signal.
Figure 11A:
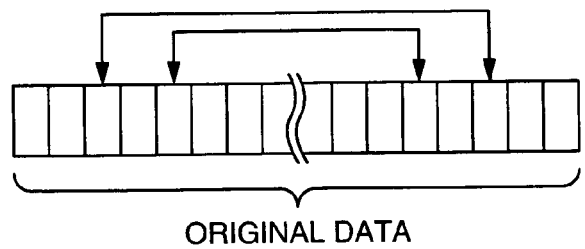
Figure 11B:
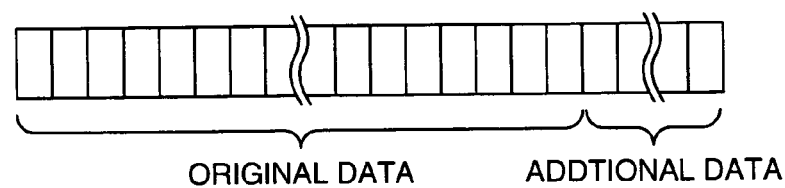
Figure 11C:
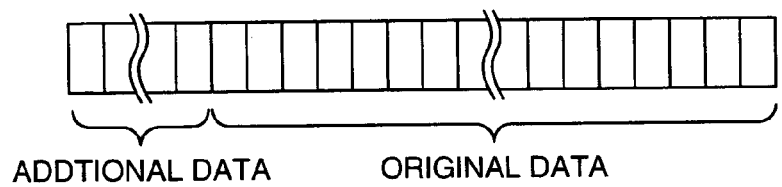
Figure 11D:
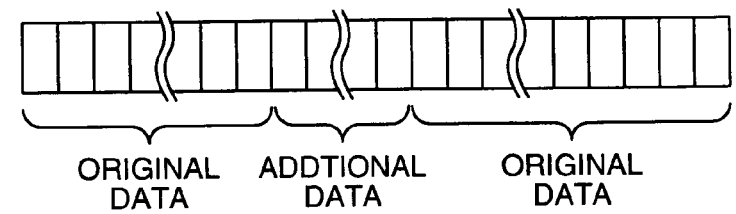

Next, another example of limiting the combination of the host system 101 and the magnetic disk apparatus 100 will be described. FIG. 9 shows, by way of example, a head positioning control system in a block diagram. Further, FIG. 10 shows a flow chart for illustrating exemplarily a procedure for generating a second eccentricity compensating signal.

The head positioning control system shown in FIG. 9 differs from that shown in the block diagram of FIG. 5 in that an encrypting or enciphering block and a decrypting or deciphering block are additionally provided. Firstly, when the command requesting generation of a second eccentricity compensating signal from the host system 101 is received (step 600), the target cylinder is set up (steps 601 to 603), whereupon seek operation is performed (step 604). Subsequently, the averaged second eccentricity compensating signal is generated for the target cylinder (step 605). In succession, the second eccentricity compensating signal as generated is encrypted or enciphered by using the authentication key (step 606) to be subsequently stored (step 607). The processings described so far are performed for all the cylinders (step 608). In the case where the second eccentricity compensating signal as stored is used, the second eccentricity compensating signal before having been enciphered is resumed by the deciphering block by making use of the authentication key. However, as the authentication key used in the deciphering block, the authentication key received from the host system 101 is used. Accordingly, the magnetic disk apparatus 100 is incapable of making use of the second eccentricity compensating signal unless the correct authentication key is received from the host system 101. Thus, arrangement may be made, for example, such that upon activation of the information recording/reproducing system comprised of the magnetic disk apparatus and the host system, the authentication key is sent to the magnetic disk apparatus from the host system. With the arrangement mentioned above, unless the combination of the host system and the magnetic disk apparatus is such that both of them have one and the same authentication key, the magnetic disk apparatus can not use the correct second eccentricity compensating signal, as a result of which the track tracing error of the head increases, rendering it impossible to conduct the normal recording/reproducing operation. In this manner, the combination of the host system 101 and the magnetic disk apparatus 100 can be limited.

In the case of the embodiment of the invention described above, the ATA (AT ATTACHMENT) standards have been presumed as the interface of the magnetic disk apparatus 100. It should however be appreciated that SCSI (Small Computer System Interface) and others can also find application. Acquisition of the authentication key from, for example, the host system 101 may be realized by using the ATA standards or by resorting to the other method(s). In one exemplary case where the ATA standards are employed, the authentication key is acquired by utilizing "Set Features" command (or alternatively "Identify Device" command). For the above command stipulated in the ATA standards, a bit indicating the start of sending the authentication key is set, for example, in the vendor-unique area or reserve area. The host system 101 (or the magnetic disk apparatus 100) monitors the issuance of "Set Feature" command (or "Identify Device" command) and the bit indicating sending of the authentication key, and when the bit is e.g. "1", the authentication key is sent to the magnetic disk apparatus 100 (or the host system 101).

As is apparent from the foregoing description, by virtue of such arrangement that mutual authentication is performed between the magnetic disk apparatus 100 and the host system 101 by using the authentication data generated on the basis of the physical characteristics of the magnetic disk apparatus, it is possible to perform such control on the side of the magnetic disk apparatus that the access to that magnetic disk apparatus is limited to the specific host system, while on the side of the host system, control can be performed such that the access is enabled limitedly to only the specific magnetic disk apparatus.

As is apparent from the foregoing, it is possible according to the teachings of the present invention to limit the magnetic disk apparatus and the host system to a specific combination by generating the authentication data on the basis of the physical characteristic(s) of the magnetic disk apparatus and performing the mutual authentication by using the authentication data as generated, since it is extremely difficult to predict the authentication data.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information recording/reproducing system comprising:
   a magnetic disk apparatus for recording/reproducing information and a host system to which said magnetic disk apparatus can be removably connected, said host system being capable of accessing said magnetic disk apparatus for recording/reproduction of the information,
   wherein said magnetic disk apparatus includes:
      a magnetic disk, and
      authentication key generating means for generating an authentication key on the basis of physical characteristic of said magnetic disk apparatus itself, and
   wherein said authentication key is generated on the basis of an eccentricity compensating signal for compensating for eccentricity characteristic of a magnetic disk which said magnetic disk apparatus includes.

2. An information recording/reproducing system according to claim 1,
   wherein said magnetic disk apparatus and said host system include authentication key recording means for recording said authentication key, respectively, authentication data generating means for generating authentication data on the basis of said authentication key, respectively, and at least one access control means for controlling access of said host system to information of said magnetic disk apparatus on the basis of the authentication of said magnetic disk apparatus.

3. An information recording/reproducing system comprising:
a magnetic disk apparatus for recording/reproducing information and a host system to which said magnetic disk apparatus can be removably connected, said host system being capable of accessing said magnetic disk apparatus for recording/reproduction of the information,
wherein said magnetic disk apparatus includes:
a magnetic disk, and
authentication key generating means for generating an authentication key on the basis of physical characteristic of said magnetic disk apparatus itself, and
wherein said authentication key is generated on the basis of result of wavelet transformation of an eccentricity compensating signal for compensating for eccentricity characteristic of a magnetic disk which said magnetic disk apparatus includes.

4. An information recording/reproducing system comprising:
a magnetic disk apparatus for recording/reproducing information and a host system to which said magnetic disk apparatus can be removably connected, said host system being capable of accessing said magnetic disk apparatus for recording/reproduction of the information,
wherein said magnetic disk apparatus includes:
a magnetic disk, and
authentication key generating means for generating an authentication key on the basis of physical characteristic of said magnetic disk apparatus itself, and
wherein said authentication key is generated on the basis of eccentricity compensating signals generated for different cylinders at three locations at the most.

5. An information recording/reproducing system comprising:
a magnetic disk apparatus for recording/reproducing information and a host system to which said magnetic disk apparatus can be removably connected, said host system being capable of accessing said magnetic disk apparatus for recording/reproduction of the information,
wherein said magnetic disk apparatus comprises:
a magnetic disk,
authentication key generating means for generating an authentication key on the basis of physical characteristic of said magnetic disk apparatus itself,
means for generating an eccentricity compensating signal for compensating for eccentricity of a magnetic disk which said magnetic disk apparatus includes,
means for enciphering said eccentricity compensating signal on the basis of said authentication key,
means for recording said eccentricity compensating signal enciphered, and
means for deciphering said enciphered eccentricity compensating signal to thereby restore the eccentricity compensating signal before having been enciphered on the basis of said authentication key.

* * * * *